US009762143B2

(12) United States Patent
Matsuoka et al.

(10) Patent No.: US 9,762,143 B2
(45) Date of Patent: Sep. 12, 2017

(54) DEVICES AND METHODS FOR CONTROLLING CURRENT IN INVERTERS

(71) Applicant: TOSHIBA MITSUBISHI-ELECTRIC INDUSTRIAL SYSTEMS CORPORATION, Tokyo (JP)

(72) Inventors: Yuji Matsuoka, Tokyo (JP); Tsuguhiro Tanaka, Tokyo (JP); Paul Bixel, Salem, VA (US); Tatsuaki Ambo, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 142 days.

(21) Appl. No.: 14/698,897

(22) Filed: Apr. 29, 2015

(65) Prior Publication Data
US 2016/0322917 A1 Nov. 3, 2016

(51) Int. Cl.
*H02M 7/493* (2007.01)
*H02M 1/36* (2007.01)
*H02M 7/5387* (2007.01)
*H02M 7/77* (2006.01)
*H02M 1/00* (2006.01)
*H02M 3/158* (2006.01)
*H02M 1/32* (2007.01)

(52) U.S. Cl.
CPC .......... *H02M 7/493* (2013.01); *H02M 1/32* (2013.01); *H02M 1/36* (2013.01); *H02M 7/53875* (2013.01); *H02M 3/1584* (2013.01); *H02M 7/77* (2013.01); *H02M 2001/007* (2013.01); *H02M 2001/0067* (2013.01); *H02M 2001/0083* (2013.01); *H02M 2001/322* (2013.01)

(58) Field of Classification Search
CPC ..... H02M 2001/067; H02M 2001/322; H02M 1/32; H02M 1/36; H02M 2001/0083; H02M 2007/4822; H02M 7/493; H02M 2001/007; H02M 3/1584; H02M 3/18
See application file for complete search history.

(56) References Cited

U.S. PATENT DOCUMENTS

| 2010/0164278 | A1* | 7/2010 | Oyobe | B60K 6/365 307/9.1 |
| 2010/0296204 | A1* | 11/2010 | Ichikawa | B60K 6/445 361/15 |
| 2014/0204643 | A1* | 7/2014 | Wagoner | H02M 7/5387 363/132 |
| 2015/0016159 | A1* | 1/2015 | Deboy | H02J 3/383 363/71 |
| 2015/0123612 | A1* | 5/2015 | Ide | B60L 11/1812 320/109 |
| 2015/0145462 | A1* | 5/2015 | Ulrich | H02M 5/458 318/503 |
| 2016/0226256 | A1* | 8/2016 | Falk | H01L 31/02021 |

FOREIGN PATENT DOCUMENTS

JP 2009-195048 8/2009

* cited by examiner

*Primary Examiner* — Fred E Finch, III
*Assistant Examiner* — Rafael O De Leon Domenech
(74) *Attorney, Agent, or Firm* — Finnegan, Henderson, Farabow, Garrett & Dunner, L.L.P.

(57) ABSTRACT

An inverter controller is configured to control inverters connected in parallel. The inverter controller is configured to closes switch of a first inverter and turn on a first switching element provided at the first inverter to charge capacitors of the inverters at the time of starting the inverters, and to close the other switches after the capacitors are charged.

10 Claims, 6 Drawing Sheets

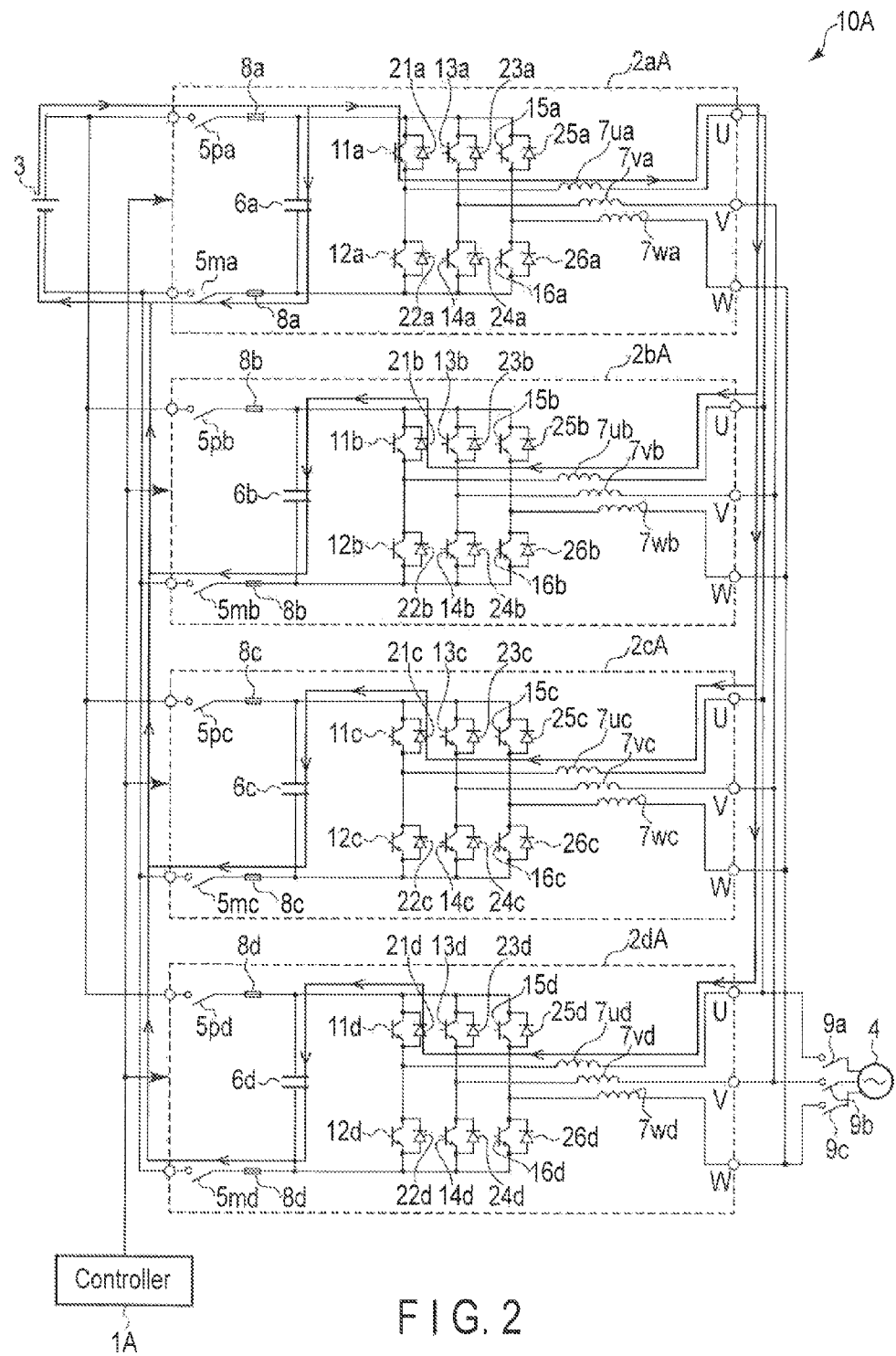
F I G. 2

DEVICES AND METHODS FOR CONTROLLING CURRENT IN INVERTERS

BACKGROUND OF THE INVENTION

1. Field of the Invention

Embodiments described herein relate generally to an inverter controller configured to control an inverter.

2. Description of the Related Art

In general, there is a power supply system in which a plurality of inverters are connected in parallel. When the operation of a power supply system with a capacitor provided on a DC side of each inverter is started, a charging current greater than normal currents flows from a capacitor which has been charged first to another capacitor which has not been charged. If such a charging current flows through an element such as a fuse, the element may be damaged.

To address this problem, a power supply device wherein a series body in which a conductor and a resistor for prevention of an inrush current are connected in series is connected between a power conversion circuit and an input voltage source to prevent an overcurrent flowing between capacitors has been disclosed (refer to Japanese Patent Application KOKAI publication No. 2009-195048).

However, if a circuit for prevention of an overcurrent flowing between capacitors is incorporated into a power supply system, the power supply system will become larger in size or the manufacturing costs thereof will increase.

BRIEF SUMMARY OF THE INVENTION

It is an object of the invention to provide an inverter controller that prevents an overcurrent flowing between capacitors provided, at respective inverters without making a power supply system larger in size.

In accordance with an aspect of embodiments, there is provided an inverter controller configured to control inverters being provided with capacitors and first switches on DC sides, respectively, the DC sides of the inverters being connected in parallel, AC sides of the inverters being connected in parallel. The inverter controller comprises a first start-time controller configured to perform first start-time control of closing the first switch of a first inverter of the inverters and turning on at least a first switching element provided at the first inverter to charge the respective capacitors of the inverters at the time of starting the inverters; and a second start time controller configured to perform second start-time control of closing the respective first switches of the inverters after the respective capacitors of the inverters are charged by the first start-time control by the first start-time controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a structure diagram showing the structure of a power supply system according to a second embodiment of the invention;

DETAILED DESCRIPTION OF THE INVENTION

First Embodiment

Figure 1:
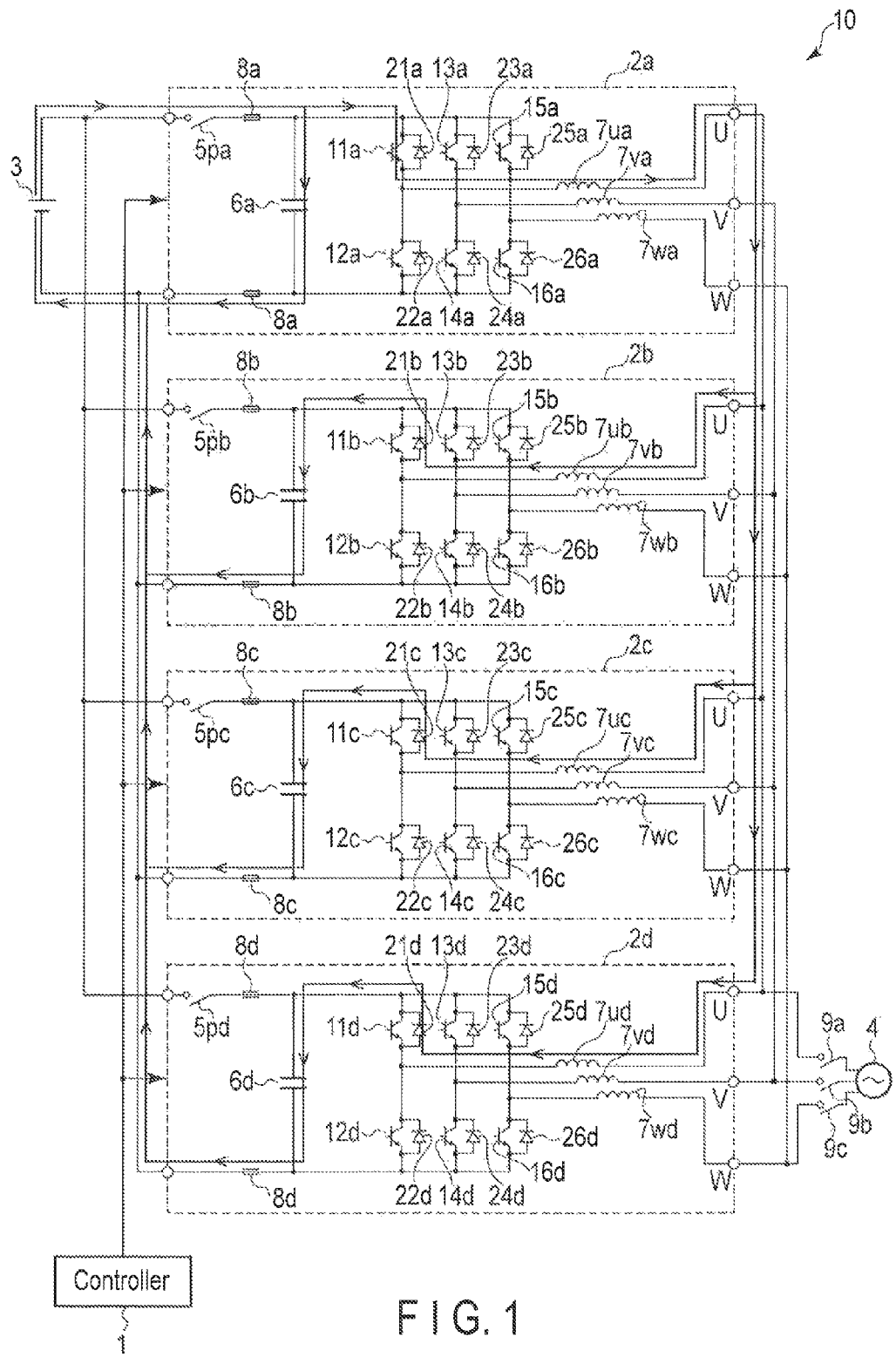
FIG. 1 is a structure diagram showing the structure of a power supply system according to a first embodiment of the invention.

FIG. 1 is a structure diagram showing the structure of a power supply system 10 according to a first embodiment of the invention. The identical portions in the drawings are given the same reference signs, and the detailed explanations thereof will be omitted. Different portions will be mainly described.

The power supply system 10 is optionally isolated from three-phase alternating-current power system 4 by switching elements 9a, 9b and 9c.

The power supply system 10 includes a controller 1, four inverter units 2a, 2b, 2c and 2d, and a photovoltaic (PV) array 3.

The photovoltaic array 3 is an aggregate of photovoltaic cells which generate electricity with energy of sunlight. The photovoltaic array 3 supplies generated direct-current power to the inverter 1. The photovoltaic array 3 may be any other things as long as they are a direct-current power supply. For example, it may be a dispersed power supply such as a wind power generator and a hydraulic power generator, or may be a converter which converts alternating-current power into direct-current power.

The inverter units 2a to 2d are connected in parallel. More specifically, the DC sides of the respective inverter units 2a to 2d are short-circuit (connected in parallel) and the AC sides of the respective inverter units 2a to 2d are short-circuit (connected in parallel). In the inverter units 2a to 2d, the photovoltaic array 3 is connected to the DC sides and the power system 4 is connected to the AC sides. The inverter units 2a to 2d convert direct-current power output from the photovoltaic array 3 into three-phase alternating-current power synchronizing with a system voltage of the power system 4. The inverter units 2a to 2d supply converted alternating-current power to the power system 4.

The inverter unit 2a includes a positive-electrode-side switch 5pa, a capacitor 6a, reactors 7ua, 7va and 7wa of three phases, two fuses 6a, six switching elements 11a, 12a, 13a, 14a, 15a and 16a, and six anti-parallel diodes 21a, 22a, 23a, 24a, 25a and 26a.

The inverter unit 2b includes a positive-electrode-side switch 5pb, a capacitor 6b, reactors 7ub, 7vb and 7wb of three phases, two fuses 8b, six switching elements 11b, 12b, 13b, 14b, 15b and 16b, and six anti-parallel diodes 21b, 22b, 23b, 24b, 25b and 26b.

The inverter unit 2c includes a positive-electrode-side switch 5pc, a capacitor 6c, reactors 7uc, 7vc and 7wc of three phases, two fuses 8c, six switching elements 11c, 12c, 13c, 14c, 15c and 16c, and six anti-parallel diodes 21c, 22c, 23c, 24c, 25c and 26c.

The inverter unit 2d includes a positive-electrode-side switch 5pd, a capacitor 6d, reactors 7ud, 7vd and 7wd of three phases, two fuses 8d, six switching elements 11d, 12d, 13d, 14d, 15d and 16d, and six anti-parallel diodes 21d, 22d, 23d, 24d, 25d and 26d.

Since each of the inverter units 2a to 2d is configured in the same manner, mainly the inverter unit 2a will be hereinafter explained. The other inverter units 2b to 2d are configured in the same manner, and the explanations thereof will be omitted as appropriate.

The six switching elements 11a to 16a and the six anti-parallel diodes 21a to 26a constitute a power conversion circuit which converts direct-current power into three-phase alternating-current power. The anti-parallel diodes 21a to 26a are connected to the switching elements 11a to 16a, respectively, in anti-parallel. The switching element 11a and the anti-parallel diode 21a constitute a U-phase upper arm (positive-electrode-side arm). An arm is a circuit constituting a part of the power conversion circuit. The switching element 12a and the anti-parallel diode 22a constitute a U-phase lower arm (negative-electrode-side arm). The switching element 13a and the anti-parallel diode 23a constitute a V-phase upper arm. The switching element 14a and the anti-parallel diode 24a constitute a V-phase lower arm. The switching element 15a and the anti-parallel diode 25a constitute a W-phase upper arm. The switching element 16a and the anti-parallel diode 26a constitute a W-phase lower arm.

A node (a connection point) of the two switching elements lie and lie constituting the U-phase arm is connected to the power system 4 through the U-phase reactor 7ua. A node of the two switching elements 13a and 14a constituting the V-phase arm is connected to the power system 4 through the V-phase reactor 7va. A node of the two switching elements 15a and 16a constituting the W-phase arm is connected to the Dower system 4 through the W-phase reactor 7wa. From the respective reactors 7ua, 7va and 7wa, alternating currents of respective phases are output.

The capacitor 6a is connected between a positive electrode and a negative electrode on a DC side of the power conversion circuit. The capacitor 6a is an element which smooths a direct-current voltage.

The positive-electrode-side switch 5pa is provided at the positive electrode on the DC side of the power conversion circuit. By opening the positive-electrode-side switch 5pa, a positive electrode of the photovoltaic array 3 and the positive electrode of the power conversion circuit are electrically disconnected. When the inverter unit 2a is operated, the positive-electrode-side switch 5pa is closed. When the inverter unit 2a is stopped, the positive-electrode-side switch 5pa is opened.

The fuses 8a are provided at the positive electrode and the negative electrode on the DC side of the power conversion circuit, respectively. The fuses 8e are elements which protects the power conversion circuit from an overcurrent. The fuses 8a may be provided also on the AC side of the power conversion circuit.

The controller 1 controls each of the inverter units 2a to 2d. For example, the controller 1 performs opening and closing control of the positive-electrode-side switch 5pa, opening and closing control of AC interconnection switches 9a, 9b and 9c, switching control of each of the switching elements lie to 16a, etc., for the inverter unit 2a. The controller 1 controls alternating-current power output from the inverter unit 2a by driving (switching) the switching elements 11a to 16a.

Next, the control by the controller 1 at the time of starting the power supply system 10 will be described.

As control at the time of a first start all switches 9e, 9b and 9c are initially open, the controller 1 closes the positive-electrode-side switch 5pa of the inverter unit 2a. At this time, the positive-electrode-side switches 5pb to 5pd of the other inverter units 2b to 2d are opened. Moreover, the controller 1 turns on at least one of the switching elements 11a, 13a and 15a constituting the upper arms of the inverter unit 2a. Any of the switching elements 11a, 13a and 15a may be turned on, or all of the switching elements 11a, 13a and 15a may be turned on Here, it is assumed that only the switching element 11a of the U-phase upper arm is turned on.

By closing the positive-electrode-side switch 5pa, the capacitor 6a of the inverter unit 2a is charged by the photovoltaic array 3. Moreover, by turning on the switching element 11a, the positive electrode of an output voltage of the photovoltaic array 3 is applied to the positive electrodes of the respective capacitors 6b to 6d of the other inverter units 2b to 2d. Also, the negative electrode of the photovoltaic array 3 is connected to the negative electrodes of the respective capacitors 6b to 6d of the inverter units 2b to 2d from the beginning. Thus, by closing the positive-electrode-side switch 5pa and turning on the switching element 11a, the respective capacitors 6b to 6d of the inverter units 2b to 2d, the positive-electrode-side switches 5pb to 5pd of which are not closed are opened), are also charged by the photovoltaic array 3.

After the capacitors 6a to 6d of all the inverter units 2a to 2d are charged, the controller 1 closes the positive-electrode-side switches 5pb to 5pd of the other inverter units 2b to 2d as control at the time of a second start. The operation of the power supply system 10 is thereby started.

It may be determined by any methods that all the capacitors 6a to 6d have been charged. For example, a determination can be made by detecting a voltage of each of the capacitors 6a to 6d, or if a preset period of time has passed, it may be presumed that all the capacitors 6a to 6d have been charged. Also, as long as a charging current flowing between the capacitors 6a to 6d does not become an overcurrent, the positive electrode-side switches 5pb to 5pd of the other inverter units 2b to 2d may be closed even if all the capacitors 6a to 6d are not necessarily charged fully.

The principle or charging the capacitor 6b of the inverter unit 2b, the positive-electrode-side switch 5pb of which is not closed, when the positive-electrode-side switch 5pa of the inverter unit 2a is closed and the switching element 11a of the U-phase upper arm is turned on will be described with reference to FIG. 1. The capacitors 6c and 6d of the other inverter units 2c and 2d are also charged in the same manner. The arrows in FIG. 1 indicate the flow of a current charging the capacitors 6a to 6d of the respective inverter units 2a to 2d.

A current output from the photovoltaic array 3 is input to the DC side of the inverter unit 2a and is output to the AC side of the inverter unit 2a through the positive-electrode-side switch 5pa, the switching element 11a of the U-phase upper arm, which is turned on, and the U-phase reactor 7ua in sequence.

Because the AC sides of the respective inverter units 2a to 2d are short-circuit phase by phase, a current output from the AC side of the inverter unit 2a is input to the AC side of the inverter unit 2b. The current input from the AC side of the inverter unit 2b is input to the positive electrode, of the capacitor 6b through the U-phase reactor 7ub and the anti-parallel diode 21b of the U-phase upper arm in sequence, current output from the negative electrode of the capacitor 6b is input to the negative electrode of the photovoltaic array 3. By a current flowing in this manner, the capacitor 6b of the inverter unit 2b is charged.

Here, the case in which at the time of starting the power supply system 10 and all switches 9a, 9b and 9c are initially open, first, the positive-electrode-side switch 5pa of the inverter unit 2a is closed, and then the positive-electrode-side switch 5pb of the inverter unit 2b is closed without turning on the switching elements 11a, 13a and 15a of the upper arms will be described.

First, when the positive-electrode-side switch 5pa of the inverter unit 2a is closed, the capacitor 6a of the inverter unit 2a is charged. At this time, the capacitor 6b of the inverter unit 2b, the positive-electrode-side switch 5pb of which is not closed, is in the state of being substantially discharged.

If the positive-electrode-side switch 5pb of the inverter unit 2b is closed in this state, since the DC sides of the two inverter units 2a and 2b are short-circuit, a closed circuit is formed by the capacitor 6a of the inverter unit 2a and the capacitor 6b of the inverter unit 2b. That is, the charged capacitor 6a and the uncharged capacitor 6b are directly connected. Thus, if the positive-electrode-side switch 5pb is closed, an excessive charging current (short-circuit current) flows from the capacitor 6a, which is already charged, to the capacitor 6b, which is not charged yet.

Because this charging current is greater than a current flowing at the time of normal operation of the power supply system 10, the fuses 8a and 8b provided in an electrical path through which the charging current flows may deteriorate or blow.

According to the present embodiment, the capacitors 6b to 6d of the respective inverter units 2b to 2d, the positive-electrode-side switches 5pb to 5pd of which are not closed, also can be charged by turning on at least one of the switching elements 11a, 13a and 15a of the upper arms (the arms on the same polarity side as that of the positive-electrode-side switch 5pa) of the inverter unit 2a, the positive-electrode-side switch 5pa of which is closed first, at the time of starting the power supply system 10 which outputs three-phase alternating-current power. In other words, the controller 1 performs control to turn on any of the switching elements 11a to 16a of the inverter unit 2a, the switch 5pa of which is closed, such that the capacitors 6b to 6d of the respective inverter units 2b to 2d, the switches 5pb to 5pd of which are not closed, are also charged. A charging current (short-circuit current) can be thereby prevented from flowing between the capacitors 6a to 6d when the positive-electrode-side switches 5pb to 5pd are closed.

Thus, the fuses 8a to 8d provided at the respective inverter units 2a to 2d can be prevented from deteriorating or blowing be cause of such a charging current. Also, not only for the fuses 8a to 8d but for another element or the like provided in the inverter units 2a to 2d, deterioration or breakage due to such a charging current can be prevented. Once charging is complete controller 1 closes AC interconnection switches 9a, 9b and 9c and power generation can begin.

Second Embodiment

FIG. 2 is a structure diagram showing the structure of a power supply system 10A according to a second embodiment of the invention.

The power supply system 10A is obtained by replacing the inverter units 2a to 2d and the controller 1 with inverter units 2aA to 2dA and a controller 1A in the power supply system 10 according to the first embodiment shown in FIG. 1. The inverter units 2aA to 2dA are obtained by adding negative-electrode-side switches 5ma to 5md to the inverter units 2a to 2d according to the first embodiment, respectively. With respect to the other points, the power supply system 10A is the same as in the first embodiment. Also, because the controller 1A is basically the same as the controller 1 according to the first embodiment, portions differing from those of the controller 1 will be mainly described here.

Next, the control by the controller 1A at the time of starting the power supply system 10A will be described.

As control at the time of a first start all switches 9a, 9b and 9c are initially open, first, the controller 1A closes the negative-electrode-side switches 5ma to 5md of all the inverter units 2aA to 2dA. This is followed by the same control as that by the controller 1 according to the first embodiment. That is, the positive-electrode-side switch 5pa of the inverter unit 2aA is closed, and at least one of the switching elements 11a, 13a and 15a constituting the upper arms of the inverter unit 2aA is turned on. The capacitors 6a to 6d of all the inverter units 2aA to 2dA are thereby charged. Thereafter, as control at the time of a second start, the controller 1A closes the positive-electrode-side switches 5pb to 5pd of the other inverter units 2bA to 2dA. The operation of the power supply system 10A is thereby started.

The arrows in FIG. 2 indicate the flow of a current charging the capacitors 6a to 6d of the respective inverter units 2aA to 2dA before the positive-electrode-side switches 5pb to 5pd of the inverter units 2bA to 2dA are closed. As indicated by the arrows of FIG. 2, in the power supply system 10A, a current charging each of the capacitors 6a to 6d flows as in the first embodiment shown in FIG. 1.

According to the present embodiment, the same operation and effect as those in the first embodiment can be obtained in the power supply system 10A, in which the positive-electrode-side switches 5pa to 5pd and the negative-electrode-side switches 5ma to 5md are provided at the respective inverter units 2aA to 2dA.

Third Embodiment

Figure 3:
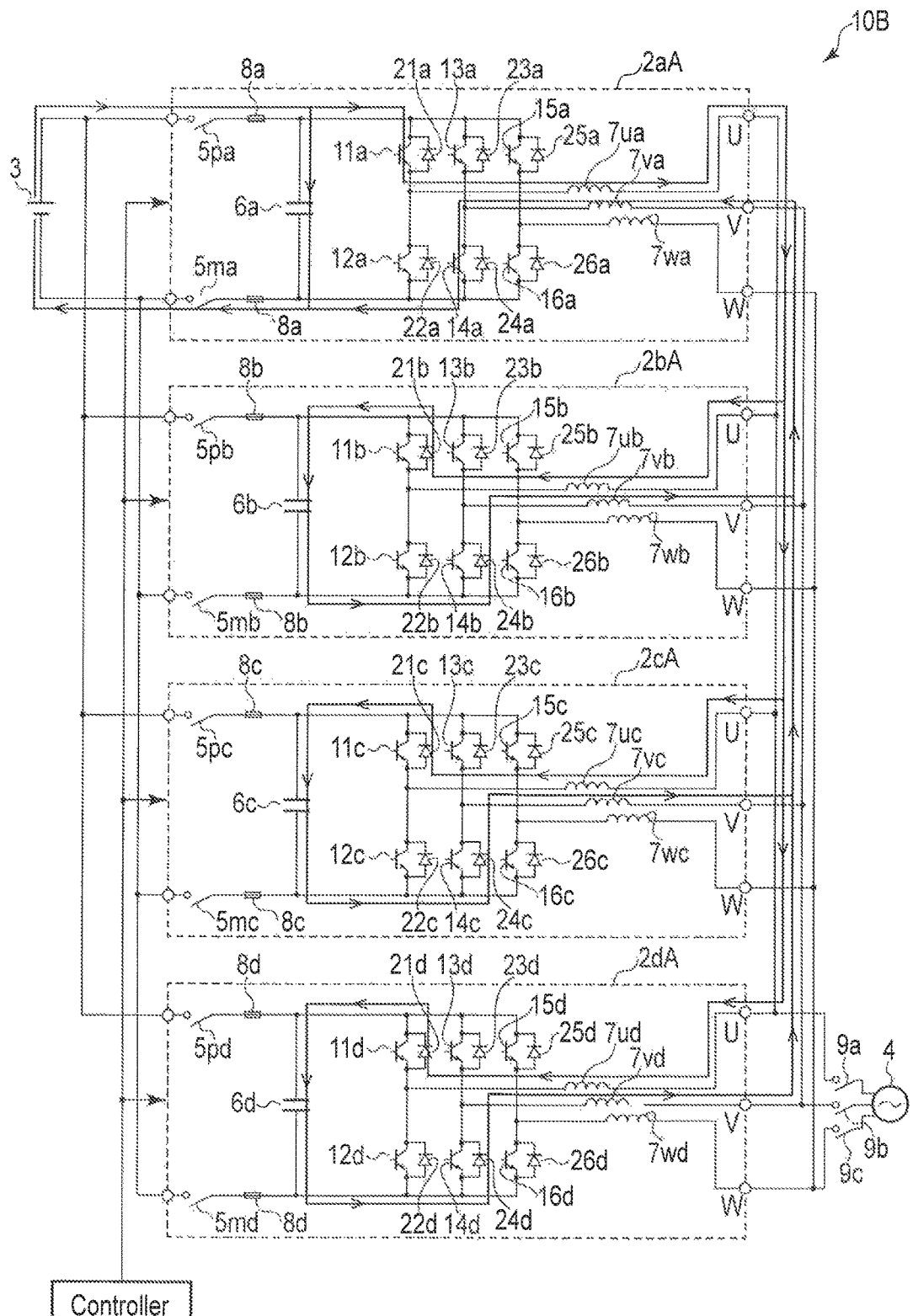
FIG. 3 is a structure diagram showing the structure of a power supply system according to a third embodiment of the invention.

FIG. 3 is a structure diagram showing the structure of a power supply system 10B according to a third embodiment of the invention.

The power supply system 10b is obtained by replacing the controller 1A with a controller 1B in the power supply system 10A according to the second embodiment shown in FIG. 2. With respect to the other points, the power supply system 10B is the same as in the second embodiment. Also, because the controller 16 is basically the same as the controller 1A according to the second embodiment, portions differing from those of the controller 1A will be mainly described here.

Next, the control by the controller 16 at the time of starting the power supply system 106 will be described.

As control at the time of a first start all switches 9a, 9b and 9c are initially open, the controller if closes the positive-electrode-side switch 5pa and the negative-electrode-side switch 5*ma* of the inverter unit 2*a*A. At this time, the positive-electrode-side switches 5*pb* to 5*pd* and the negative-electrode-side switches 5*mb* to 5*md* of the other inverter units 2*b*A to 2*d*A are opened. Also, the controller 1B turns on any one of the switching elements 11*a*, 13*a* and 15*a* constituting the upper arms of the inverter unit 2*a*A. Here, it is assumed that the switching element ha of the U-phase upper arm is turned on. Moreover, the controller 1B turns on one of a different phase from that (U-phase) of the switching element 11*a* of the upper arm, which is turned on, of the switching elements 12*a*, 14*a* and 16*a* constituting the lower arms of the inverter unit 2*a*A. Thus, the controller if turns on either of the switching element him of a V-phase and the switching element 16*a* of a phase. Here, it is assumed that the switching element 14*a* of the V-phase lower arm is turned on.

By closing the positive-electrode-side switch 5*pa* and the negative-electrode-side switch 5*ma*, the capacitor 6*a* of the inverter unit 2*a*A is charged by the photovoltaic array 3. Moreover, by turning on the switching element lie of the upper arm and the switching element 14*a* of the lower arm, an output voltage of the photovoltaic array 3 is applied to the respective capacitors 6*b* to 6*d* of the other inverter units 2*b*A to 2*d*A. Thus, by closing the positive-electrode-side switch 5*pa* and the negative-electrode-side switch 5*ma* and turning on the switching element 11*a* of the upper arm and the switching element 14*a* of the lower arm in the inverter unit 2*a*A, the respective capacitors 6*b* to 6*d* of the inverter units 2*b*A to 2*d*A, the switches 5*pb* to 5*pd* and 5*mb* to 5*md* of which are not closed (are opened), are also charged by the photovoltaic array 3.

After the capacitors 6*a* to 6*d* of all the inverter units 2*a*A to 2*d*A are charged, the controller 15 closes the positive-electrode-side switches 5*pb* to 5*pd* and the negative-electrode-side switch 5*mb* to 5*md* of the other inverter units 2*b*A to 2*d*A as control at the time of a second start. The operation of the power supply system 10B is thereby started.

The principle of charging the capacitor 6*b* of the inverter unit 2*b*A, the positive-electrode-side switch 5*pb* and the negative-electrode-side switch 5*mb* of which are not closed, when the positive-electrode-side switch 5*pa* and the negative-electrode-side switch 5*ma* of the inverter unit 2*a*A are closed and the switching element 11*a* of the U-phase upper arm and the switching element 14*a* of the V-phase lower arm are turned on will be described with reference to FIG. 3. The capacitors 6*c* and 6*d* of the other inverter units 2*c*A and 2*d*A are also charged in the same manner. The arrows in FIG. 3 indicate the flow of a current charging the capacitors 6*a* to 6*d* of the respective inverter units 2*a*A to 2*d*A.

A current output from the positive electrode of the photovoltaic array 3 is input to the DC side of the inverter unit 2*a*A and is output from the U-phase of the AC side of the inverter unit 2*a*A through the positive-electrode-side switch 5*pa*, the switching element 11*a* of the U-phase upper arm, which is turned on, and the U-phase reactor 7*ua* in sequence.

Because the AC sides of the respective inverter unit s 2*a* to 2*d* are short-circuit phase by phase, a current output from the U-phase of the inverter unit 2*a*A is input to the U-phase of the inverter unit 2*b*A. A current input from the U-phase of the inverter unit 2*b*A is input to the positive electrode of the capacitor 6*b* through the U-phase reactor 7*ub* and the anti-parallel diode 21*b* of the U-phase upper arm in sequence. A current output from the negative electrode of the capacitor 6*b* is output from the V-phase of the AC side of the inverter unit 2*b*A through the anti-parallel diode 24*b* of the V-phase lower arm and the V-phase reactor 7*vb* in sequence.

A current output from the V-phase of the inverter unit 2*b*A is input to the V-phase of the inverter unit 2*a*A. A current input from the V-phase of the inverter unit 2*a*A is input to the negative electrode of the photovoltaic array 3 through the V-phase reactor 7*va* and the switching element 14*a* of the V-phase lower arm, which is turned on, in sequence. By a current flowing in this manner, the capacitor 6*b* of the inverter unit 2*b*A is charged.

According to the present embodiment, the capacitors 6*b* to 6*d* of the respective inverter units 2*b* to 2*d*, the switches 5*pb* to 5*pd* and 5*mb* to 5*md* of which are not closed, can also be charged by turning on the switching element 11*a* of the upper arm of the inverter unit 2*a*A, the in switch 5*pa* and the negative-electrode-side switch 5*ma* of which are closed first, and the switching element 14*a* of the lower arm of a different phase from that of the switching element 11*a* at the time of starting the power supply system 10B. A charging current (short-circuit current) can be thereby prevented from flowing between the capacitors 6*a* to 6*d* when the switches 5*pb* to 5*pd* and 5*mb* to 5*md* are closed.

Thus, the same operation and effect as those in the second embodiment can be obtained.

Fourth Embodiment

Figure 4:
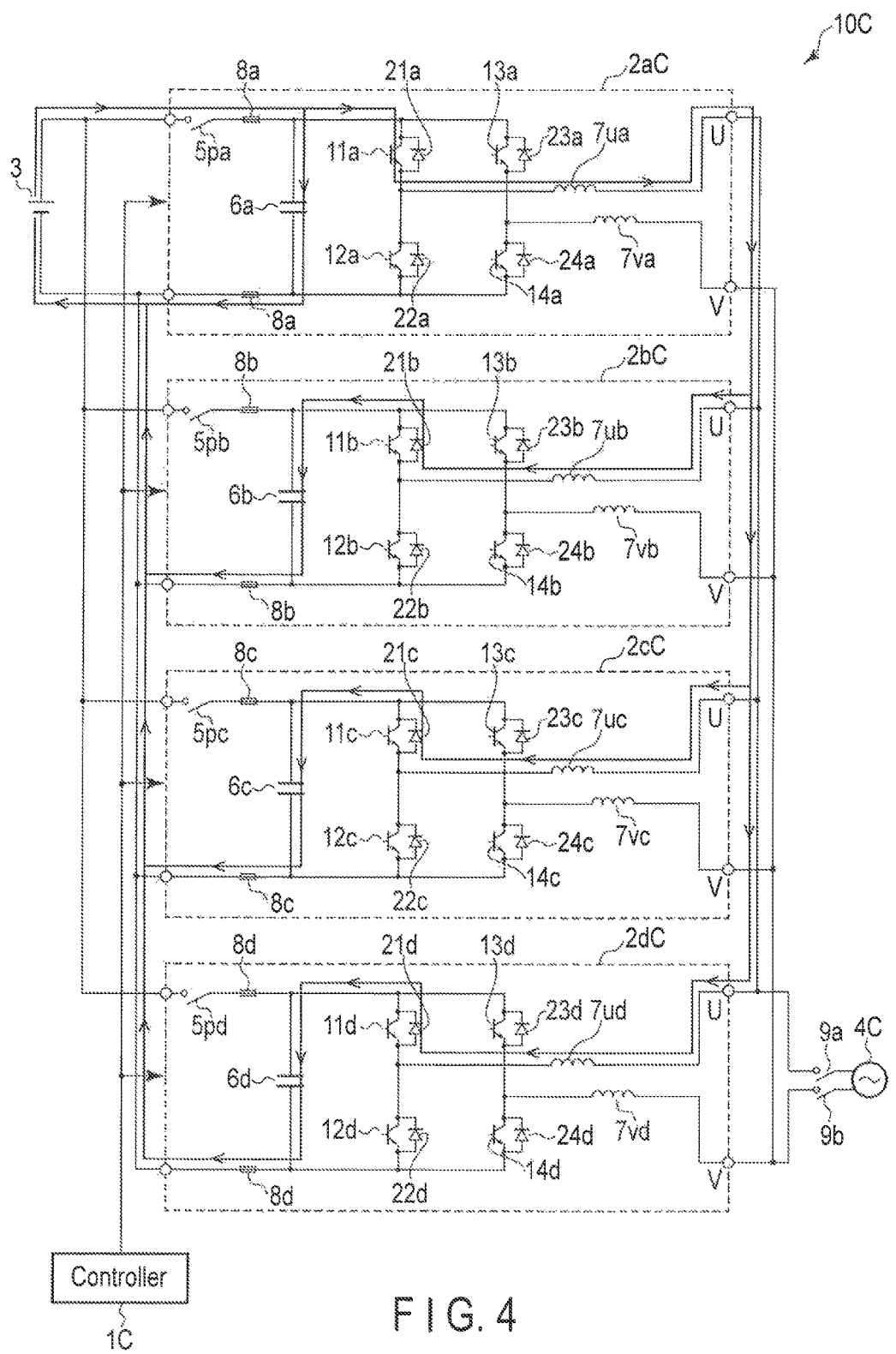
FIG. 4 is a structure diagram showing the structure of a power supply system according to a fourth embodiment of the invention.

FIG. 4 is a structure diagram showing the structure of a power supply system 10C according to a fourth embodiment of the invention.

The power supply system 10C is obtained by replacing the inverter units 2*a* to 2*d* and the controller 1 with inverter units 2*a*C to 2*d*C and a controller 1C in the power supply system 10 according to the first embodiment shown in FIG. 1. The power supply system 10C is optionally isolated from single-phase alternating-current power system 4C by switching elements 9*a* and 9*b*. With respect to the other points, the power supply system 10C is the same as in the first embodiment.

The inverter units 2*a*C to 2*d*C are obtained by changing the structure of the inverter units 2*a* to 2*d* according to the first embodiment from a three-phase inverter circuit to a single-phase inverter circuit. More specifically, the inverter units 2*a*C to 2*d*C have the same structure as that obtained by removing the reactors 7*wa* to 7*wd*, the switching elements 15*a* to 15*d* and 16*a* to 16*d* and the anti-parallel diodes 25*a* to 25*d* and 26*a* to 26*d*, which are a W-phase structure in the inverter units 2*a* to 2*d*.

Because the controller 1C is basically the same as the controller 1 according to the first embodiment, portions differing from those of the controller 1 will be mainly described here.

Next, the control by the controller 1C at the time of starting the power supply system 10C will be described.

As control at the time of a first start all switches 9*a* and 9*b* are initially open, the controller 1C closes the positive-electrode-side switch 5*pa* of the inverter unit 2*a*C. At this time, the positive-electrode-side switches 5*pb* to 5*pd* of the other inverter units 2*b*C to 2*d*C are opened. Moreover, the controller 1C turns on at least one of the switching elements 11*a* and 13*a* constituting the upper arms of the inverter unit 2*a*C. Either of the switching elements 11*a* and 13*a* may be turned on, or both or the switching elements 11*a* and 13*a* may be turned on. Here, it is assumed that only the switching element lie of the U-phase upper arm is turned on.

By closing the positive-electrode-side switch 5*pa*, the capacitor 6*a* of the inverter unit 2*a*C is charged by the photovoltaic array 3. Moreover, by turning on the switching element 11*a*, the positive electrode of an output voltage of the photovoltaic array 3 is applied to the positive electrodes of the respective capacitors 6b to 6d of the other inverter units 2bC to 2dC. Also, the negative electrode of the photovoltaic array 3 is connected to the negative electrodes of the respective capacitors 6b to 6d of the inverter units 2bC to 2dC from the beginning. Thus, by closing the positive electrode-side switch 5pa and turning on the switching element 11a, the respective capacitors 6b to 6d of the inverter units 2bC to 2dC, the positive-electrode-side switches 5pb to 5pd of which are not closed (are opened), are also charged by the photovoltaic array 3.

After the capacitors 6a to 6d of all the inverter units 2aC to 2dC are charged, the controller 1C closes the positive-electrode-side switches 5pb to 5pd of the other inverter units 2bC to 2dC as control at the time of a second start. The operation of the power supply system 10C is thereby started.

The arrows in FIG. 4 indicate the flow of a current charging the capacitors 6a to 6d of the respective inverter units 2aC to 2dC before the positive-electrode-side switches 5pb to 5pd of the inverter units 2bC to 2dC are closed. As indicated by the arrows of FIG. 4, in the power supply system 10C, a current charging each of the capacitors 6a to 6d flows as in the first embodiment shown in FIG. 1.

According to the present embodiment, the same operation and effect as those in the first embodiment can be obtained in the power supply system 10C which outputs single-phase alternating-current power.

Fifth Embodiment

Figure 5:
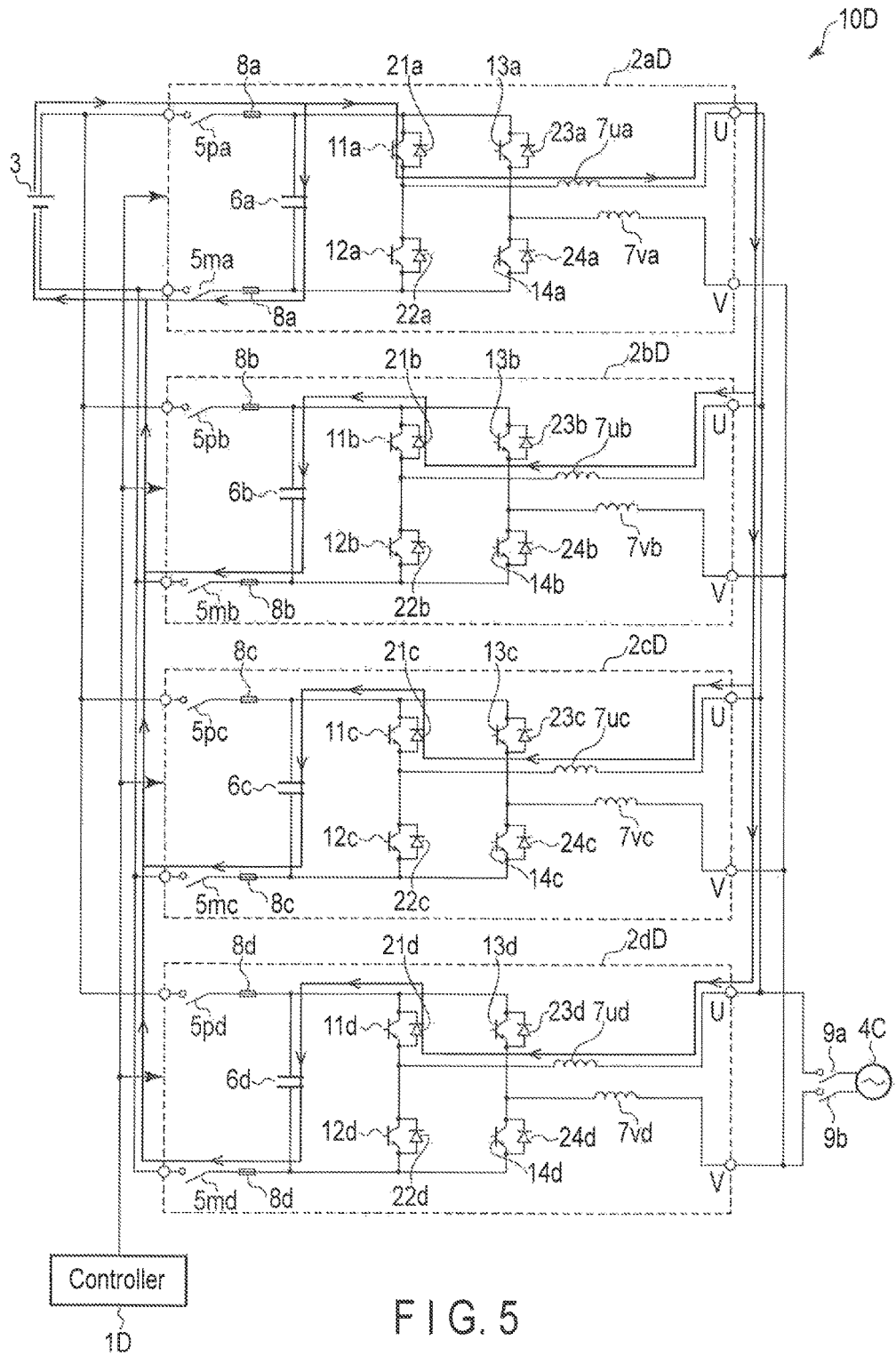
FIG. 5 is a structure diagram showing the structure of a power supply system according to a fifth embodiment of the invention.

FIG. 5 is a structure diagram showing the structure of a power supply system 100 according to a fifth embodiment of the invention.

The power supply system 10D is obtained by replacing the inverter units 2aC to 2dC and the controller 1C, with inverter units 2aD to 2dD and a controller 1D in the power supply system 10C according to the fourth embodiment shown in FIG. 4. The inverter units 2aD to 2dD are obtained by adding the negative-electrode-side switches 5ma to 5md to the inverter units 2aC to 2dC according to the fourth embodiment, respectively. With respect to the other points, the power supply system 10D is the same as in the forth embodiment. Also, because the controller 1D is basically the same as the controller 1C according to the forth embodiment, portions differing from those of the controller 10 will be mainly described here.

Next, the control by the controller 1D at the time of starting the power supply system 10D will be described.

As control at the time of a first start all switches 9a and 9b are initially open, first, the controller 1D closes the negative-electrode-side switches 5ma to 5md of all the inverter units 2aD to 2cD. This is followed by the same control as that by the controller 1C according to the fourth embodiment. That is, the positive-electrode-side switch 5pa of the inverter unit 2aD is closed, and at least one of the switching elements 11a and 13a constituting the upper arms of the inverter unit 2aD is turned on. The capacitors 6a to 6d of all the inverter units 2aD to 2cD are thereby charged. Thereafter, as control at the time of a second start, the controller 1D closes the positive-electrode-side switches 5pb to 5pd of the other inverter units 2bD to 2dD. The operation of the power supply system 10D is thereby started.

The arrows in FIG. 5 indicate the flow of a current charging the capacitors 6a to 6d of the respective inverter units 2aD to 2cD before the positive-electrode-side switches 5pb to 5pd of the inverter units 2bD to 2cD are closed. As indicated by the arrows of FIG. 5, in the power supply system 10D, a current charging each of the capacitors 6a to 6d flows as in the forth embodiment shown in FIG. 4.

According to the present embodiment, the same operation and effect as those in the forth embodiment can be obtained in the power supply system 100 in which the positive-electrode-side switches 5pa to 5pd and the negative-electrode-side switches 5ma to 5md are provided at the respective inverters unit 2aD to 2cD.

Sixth Embodiment

Figure 6:
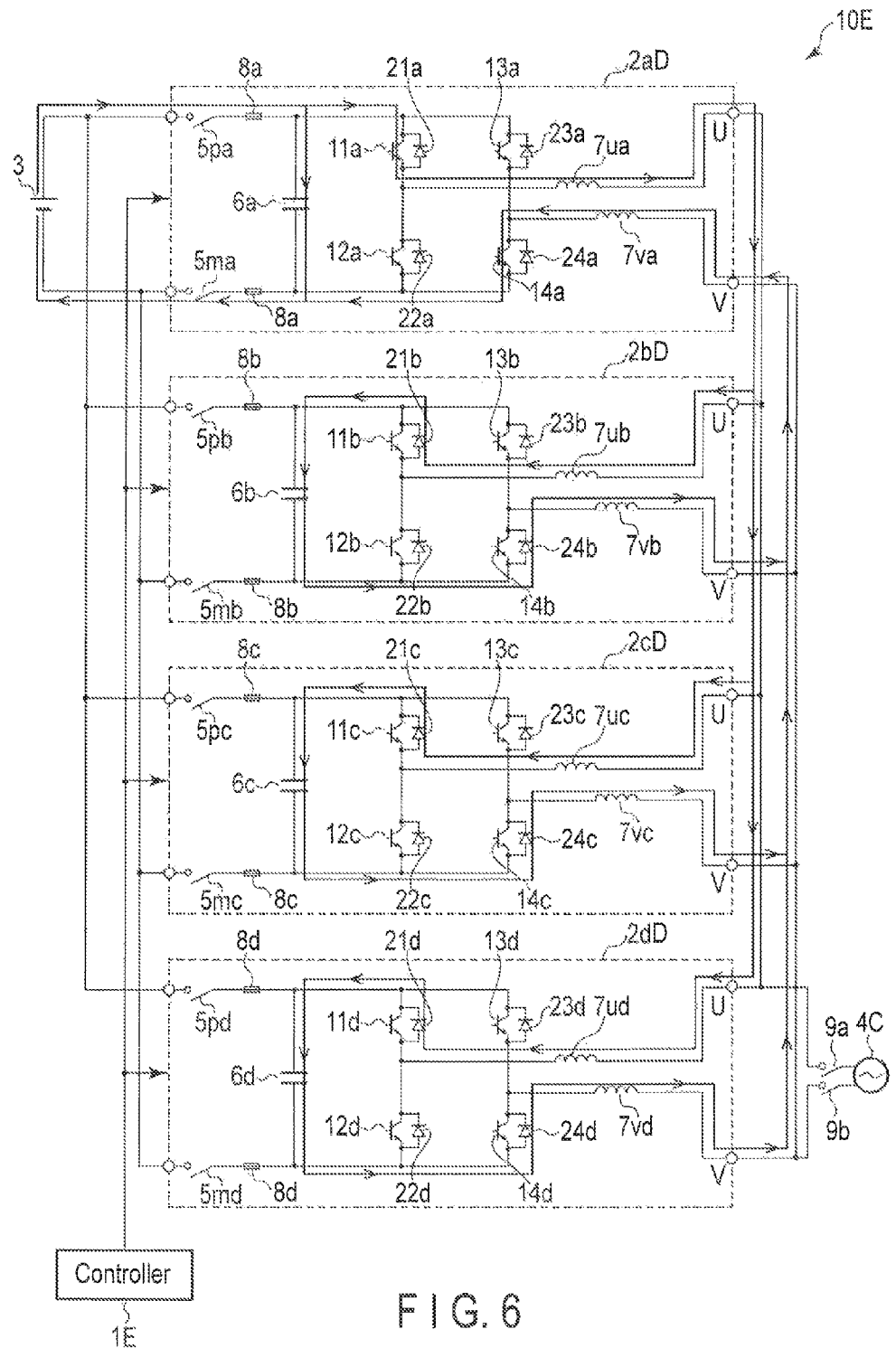
FIG. 6 is a structure diagram showing the structure of a power supply system according to a sixth embodiment of the invention.

FIG. 6 is a structure diagram showing the structure of a power supply system 10E according to a sixth embodiment of the invention.

The power supply system 10E is obtained by replacing the inverter units 2aA to 2dA and the controller 1B with the inverter units 2aD to 2dD according to the fifth embodiment and a controller 15 in the power supply system 10B according to the third embodiment shown in FIG. 3. The power supply system 10E interconnects with the single-phase alternating-current power system 4C. With respect to the other points, the power supply system 10E is the same as in the third embodiment. Also, because the controller 1E is basically the same as the controller 1B according to the third embodiment, portions differing from those of the controller 1B will be mainly described here.

Next, the control by the controller 1E at the time of starting the power supply system 10E will be described.

As control at the time of a first start all switches 9a and 9b are initially open, the controller 1E closes the positive-electrode-side switch 5pa and the negative-electrode-side switch 5ma of the inverter unit 2aD. At this time, the positive-electrode-side switches 5pb to 5pd and the negative-electrode-side switches 5mb to 5mb of the other inverter units 2bD to 2cD are opened. Also, the controller 13 turns on at least one of the switching elements 11a and 13a constituting the upper arms of the inverter unit 2aD. Here, it is assumed that the switching element 11a of the U-phase upper arm is turned on. Moreover, the controller 1E turns on one of a different phase from that (U-phase) of the switching element 11a of the upper arm, which is turned on, of the switching elements 12a and 14a constituting the lower arms of the inverter unit 2aD. Thus, here, the switching element 14a of the V-phase lower arm is turned on.

By closing the positive-electrode-side switch 5pa and the negative-electrode-side switch 5ma, the capacitor 6a of the inverter unit 2aD is charged by the photovoltaic array 3. Moreover, by turning on the switching element ha of the upper arm and the switching element 14a of the lower arm, an output voltage of the photovoltaic array 3 is applied to the respective capacitors 6b to 6d of the other inverter units 2bD to 2dD. Thus, by closing the positive-electrode-side switch 5pa and the negative-electrode-side switch 5ma and turning on the switching element 11a of the upper arm and the switching element 14a of the lower arm in the inverter unit 2a5, the respective capacitors 6b to 6d of the inverter units 2bD to 2dD, the switches 5pb to 5pd and 5mb to 5md of which are not closed (are opened), are also charged by the photovoltaic array 3.

After the capacitors 6a to 6d of all the inverter units 2aD to 2dD are charged, the controller 15 closes the positive-electrode-side switches 5pb to 5pd and the negative-electrode-side switches 5mb to 5md of the other inverter units 2bD to 2cD as control at the time of a second start. The operation of the power supply system 105 is thereby started.

The arrows in FIG. 6 indicate the flow of a current charging the capacitors 6a to 6d of the respective inverter units 2aD to 2cD. As indicated by the arrows of FIG. 6, in the power supply system 105, a current charging each of the capacitors 6a to 6d flows as in the third embodiment shown in FIG. 3.

According to the present embodiment, the same operation and effect as those in the third embodiment can be obtained in the power supply system 105 which outputs single-phase alternating-current power.

In the first embodiment, in the control at the time of starting the power supply system 10, first, the switching element 11a is turned on only in the one inverter unit 2a. However, the switching elements 11a to 11d at the same points may be turned on in the two or more inverter units 2a to 2d. For example, in the control, at the time of a start, first, the switching elements 11a, 13a, 15a, . . . , 11d, 13d, and 15d of the upper arms of all the phases may be turned on in all the inverter units 2a to 2d. The impedance of a circuit through which a current charging each of the capacitors 6a to 6d flows can be thereby reduced. Similarly, also in the other embodiments, impedance can be reduced by turning on switching elements at the same points in two or more inverter units.

In each of the embodiments, any switching element may be turned on in the control at the time of a first start, provided that a switching element of an inverter unit a switch of which is closed is turned on to charge a capacitor of an inverter unit a switch of which is not closed. For example, the same control may be performed, interchanging a positive electrode and a negative electrode. More specifically, in the power supply system 10A according to the second embodiment shown in FIG. 2, the capacitors 6a to 6d of all the inverter units 2aA to 2dA may be charged by closing the positive-electrode-side switches 5pa to 5pd of all the inverter units 2aA to 2dA and the negative-electrode-side switch 5ma of the one inverter unit 2aA and turning on at least one of the switching elements 12a, 14a and 16a of the lower arms on the same polarity side as that of the negative-electrode-side switch 5ma at the time of a start. The same is true of the other embodiments.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. An inverter controller configured to control inverters being provided with capacitors and first switches on DC sides, respectively, the DC sides of the inverters being connected in parallel AC sides of the inverters being connected in parallel, comprising:
a first start-time controller configured to perform first start-time control of closing the first switch of a first inverter of the inverters and turning on at least a first switching element provided at the first inverter to charge the respective capacitors of the inverters at the time of starting the inverters; and
a second start-time controller configured to perform second start-time control of closing the respective first switches of the other inverters after the respective capacitors of the inverters are charged by the first start-time control by the first start-time controller.

2. The inverter controller of claim 1, wherein the first start-time controller closes the first switch of the first inverter and turns on the first switching element which is provided on the same polarity side as a polarity side of the first switch of the first inverter as the first start-time control.

3. The inverter controller of claim 1, wherein the first start-time controller closes the first switch, of the first inverter and turns on the first switching elements which are provided on the same polarity sides as polarity sides of the respective first switches of the inverters, respectively, as the first start-time control.

4. The inverter controller of claim 1, wherein
the inverters include second switches which are provided on opposite polarity sides to polarity sides of the first switches, respectively, and
the first start-time controller closes the respective second switches of the inverters as the first start-time control.

5. The inverter controller of claim 1, wherein
the inverters include second switches which are provided on opposite polarity sides to polarity sides of the first switches, respectively, and
the first start-time controller closes the first switch and the second switch of the first inverter and turns on the first switching element of the first inverter and a second switching element which is provided in a different phase on an opposite polarity side to a polarity side of the first switching element as the first start-time control.

6. The inverter controller of claim 1, wherein
the inverters include second switches which are provided on opposite polarity sides to polarity sides of the first switches, respectively, and
the first start-time controller closes the first switch and the second switch of the first inverter and turns on the respective first switching elements of the inverters and second switching elements which are provided in different phases on opposite polarity sides to polarity sides of the first switching elements, respectively, as the first start-time control.

7. The inverter controller of claim 1, wherein the inverters convert direct-current power into three-phase alternating-current power.

8. The inverter controller of claim 1, wherein the inverters convert direct-current power into single-phase alternating-current power.

9. An inverter control method of controlling inverters being provided with capacitors and first switches on DC sides, respectively, the DC sides of the inverters being connected in parallel, AC sides of the inverters being connected in parallel, comprising:
performing first start-time control of closing the first switch of a first inverter of the inverters and turning on at least a first switching element provided at the first inverter to charge the respective capacitors of the inverters at the time of starting the inverters; and
performing second start-time control of closing the respective first switches of the other inverters after the respective capacitors of the inverters are charged by the first start-time control.

10. A power supply system, comprising:
a power supply configured to output direct-current power;
inverters configured to convert direct-current power output from the power supply into alternating-current power, the inverters being provided with capacitors and first switches on DC sides, respectively, the DC sides of the inverters being connected in parallel, AC sides of the inverters being connected in parallel;

a first start-time controller configured to perform first start-time control of closing the first switch of a first inverter of the inverters and turning on at least a first switching element provided at the first inverter to charge the respective capacitors of the inverters at the time of starting the inverters; and a second start-time controller configured to perform second start-time control of closing the respective first switches of the other inverters after the respective capacitors of the inverters are charged by the first start-time control by the first start-time controller.

* * * * *